US012603937B2

(12) United States Patent
Medeiros et al.

(10) Patent No.: US 12,603,937 B2
(45) Date of Patent: Apr. 14, 2026

(54) I/O REQUEST PERFORMANCE IMPROVEMENT USING BACKEND AS A SERVICE

(71) Applicant: Dell Products L.P., Round Rock, TX (US)

(72) Inventors: Earl Medeiros, Fall River, MA (US); Ramesh Doddaiah, Westborough, MA (US); Rong Yu, West Roxbury, MA (US); Lixin Pang, Needham, MA (US); Jiahui Wang, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/627,649

(22) Filed: Apr. 5, 2024

(65) Prior Publication Data

US 2025/0317488 A1 Oct. 9, 2025

(51) Int. Cl.
*H04L 67/1097* (2022.01)
*G06F 3/06* (2006.01)

(52) U.S. Cl.
CPC .......... *H04L 67/1097* (2013.01); *G06F 3/061* (2013.01); *G06F 3/0656* (2013.01); *G06F 3/0689* (2013.01)

(58) Field of Classification Search
CPC ... H04L 67/1097; G06F 3/061; G06F 3/0656; G06F 3/0689; G06F 12/0802; G06F 12/0871; G06F 12/0891; G06F 13/28; G06F 13/4282; G06F 3/0659; G06F 2212/1016

USPC .......................................................... 709/212
See application file for complete search history.

(56) References Cited

U.S. PATENT DOCUMENTS

| | | | | |
|---|---|---|---|---|
| 7,299,266 | B2 * | 11/2007 | Boyd .................... | G06F 12/145 |
| | | | | 709/213 |
| 7,577,787 | B1 * | 8/2009 | Yochai ................ | G06F 12/0804 |
| | | | | 711/113 |
| 7,627,693 | B2 * | 12/2009 | Pandya ................. | H04L 69/165 |
| | | | | 709/212 |
| 10,031,883 | B2 * | 7/2018 | Hack .................... | H04L 67/5681 |
| 10,397,362 | B1 * | 8/2019 | Volpe .................. | G06F 12/0891 |
| 10,585,628 | B2 * | 3/2020 | He ....................... | G06F 3/0659 |
| 10,778,767 | B2 * | 9/2020 | Chernin ............. | H04L 67/1095 |
| 10,862,805 | B1 * | 12/2020 | Dods .................... | H04L 63/0254 |
| 11,200,168 | B2 * | 12/2021 | Johns .................. | G06F 12/0815 |
| 11,445,225 | B2 * | 9/2022 | Sotnikov ........... | H04N 21/2665 |
| 2010/0231600 | A1 * | 9/2010 | Kaufman .............. | G09G 5/393 |
| | | | | 345/545 |

(Continued)

*Primary Examiner* — Sargon N Nano
(74) *Attorney, Agent, or Firm* — DALY, CROWLEY, MOFFORD & DURKEE, LLP

(57) ABSTRACT

Methods and apparatuses are provided for utilizing additional and available system resources to cache one or more incoming I/O write requests. A storage processor may implement a policy including a Backend as a Service (BEaaS) to use a node pair backend, a fabric network, and other resources to absorb incoming bursts of I/O write requests from a host and direct the requests temporarily to NVMe storage devices. The policy may further use local and/or remote storage arrays connected over the fabric to alleviate strain on local processing resources. The policy may provide for using cut-through writes, including for example, dual-cast operations over PCIe connections, to send I/O requests directly to the NVMe storage devices.

18 Claims, 7 Drawing Sheets

(56)                    References Cited

U.S. PATENT DOCUMENTS

2012/0054446 A1*  3/2012  Wang ................. G06F 12/0811
                                              711/E12.001
2022/0261164 A1*  8/2022  Zhuravlev ............ G06F 3/0638
2023/0195659 A1*  6/2023  Agarwal  ............ G06F 13/1673
                                              711/154
2024/0036940 A1*  2/2024  Lee ...................... G06F 9/5027

* cited by examiner

I/O REQUEST PERFORMANCE IMPROVEMENT USING BACKEND AS A SERVICE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a fabric network.

Storage arrays may often experience bursts of incoming and outgoing requests. When a significant number of requests, including input/output (I/O) requests, occur within a short time span, system processing and storage resources can be strained and operational bottlenecks may occur, increasing latency and degrading input/output per second (IOPS). In a mirrored memory system, such as a RAID-1 configuration, the limited memory size reduces the number of requests, including host writes, the array can process. Local cache memory, like DRAM can be costly and may not be available to increase system resources. Further, de-staging operations during such bursts applies significant strain on back-end processing tasked with executing and managing the destage flow from cache to long term memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method for use in a storage processor may include receiving an input/output (I/O) request, determining a memory utilization threshold and determining a local memory utilization level. If the local memory utilization level equals or exceeds the memory utilization threshold, a backend service may be used to transmit the I/O request over a fabric network to a second memory.

The method may include, alone or in combination, one or more of the following features. The backend service may execute a remote direct memory access (DMA) operation to transmit the I/O request. The remote DMA operation may be executed by a remote processor. The second memory may be a RAID-1 array. The I/O request may be stored in a controller memory buffer (CMB) for staging into second memory. The local memory utilization level may include a write pending level. The local memory utilization level may be determined to have decreased below the memory utilization threshold and the I/O request may be relocated from the second memory to a local cache memory. The memory utilization threshold may be determined by a number of memory devices. The fabric network may include an Infini-Band network. The second memory may be a non-volatile memory express (NVMe).

According to another aspect, a data storage system may include a memory and at least one processor that is operatively coupled to the memory; and, at least one processor may be configured to perform the operations of receiving an input/output (I/O) request, determining a memory utilization threshold and determining a local memory utilization level. If the local memory utilization level equals or exceeds the memory utilization threshold, a backend service may be used to transmit the I/O request over a fabric network to a second memory.

The system may include, alone or in combination, one or more of the following features. The backend service may execute a remote direct memory access (DMA) operation to transmit the I/O request. The remote DMA operation may be executed by a remote processor. The second memory may be a RAID-1 array. The I/O request may be stored in a controller memory buffer (CMB) for staging to second memory. The local memory utilization level may include a write pending level. The local memory utilization level may be determined to have decreased below the memory utilization threshold and the I/O request may be relocated from the second memory to a local cache memory. The memory utilization threshold may be determined by a number of memory devices. The fabric network may include an Infini-Band network.

According to another aspect, a non-transitory computer-readable medium may store one or more processor-executable instructions. When executed by at least one processor, the instructions may cause the at least one processor to perform the operations of receiving an input/output (I/O) request, determining a memory utilization threshold, and determining a local memory utilization level. If the local memory utilization level equals or exceeds the memory utilization threshold, a backend service may be used to transmit the I/O request over a fabric network to a second memory.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
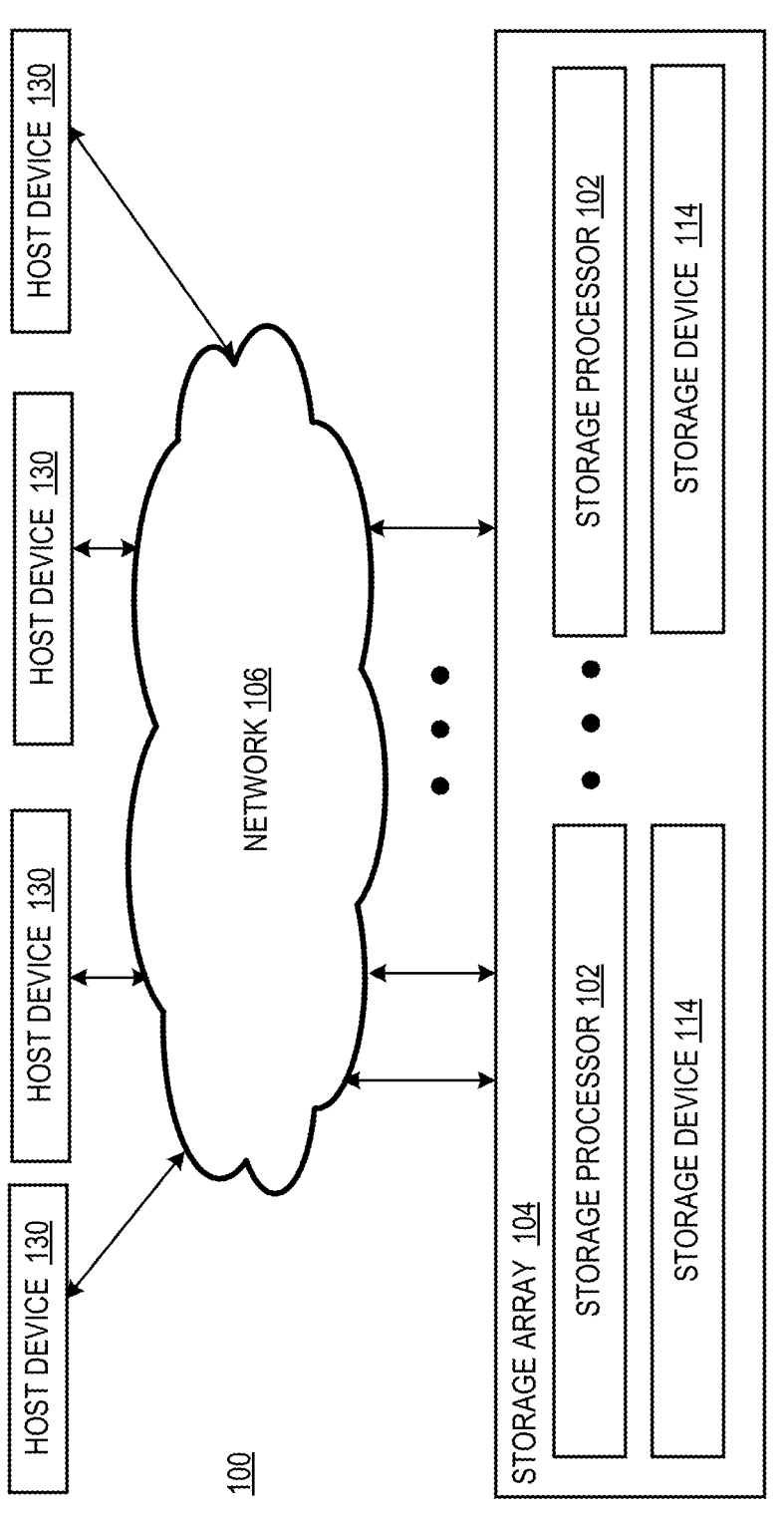
FIG. 1A is a diagram of an example of a storage system 100, according to aspects of the disclosure.

FIG. 1 is a diagram of an example of a storage system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include or be arranged with one or more node-pairs and a plurality of non-volatile memory storage devices 114. The storage devices may be configured in a RAID-1 configuration with corresponding mirrored memories. Each node of the node pairs may include one or more storage processors 102. Each of the storage processors 102 may be configured to receive I/O requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device.

According to one aspect, each of storage devices 114 may be a non-volatile memory express (NVMe) drive. In another aspect, the storage devices may be solid-state drives (SSD). In some implementations, each of the storage devices 114 may be connected to the storage processors 102 via a Peripheral Component Interconnect Express (PCIe) connection. Each of the storage devices 114 may include a respective controller (not shown) and storage medium (not shown). The controller of each storage device 114 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

In some implementations, the storage processors 102 and the storage devices 114 may be located in geographically disparate locations. For example, the storage processors 102 may be distributed across multiple cities, countries, or continents. Similarly, the storage devices 114 (and/or the disk array enclosures of which they are part) may also be distributed across multiple cities, countries, or continents. Additionally or alternatively, in some implementations, the storage processors 102 and the storage devices 114 may be located in the same geographic location, but in different buildings of the same campus (or different rooms of a large building). As discussed further below, the storage array 104 may employ a method for writing I/O requests and other data across remote locations of the storage devices 114 and/or storage processors 102.

Figure 1B:
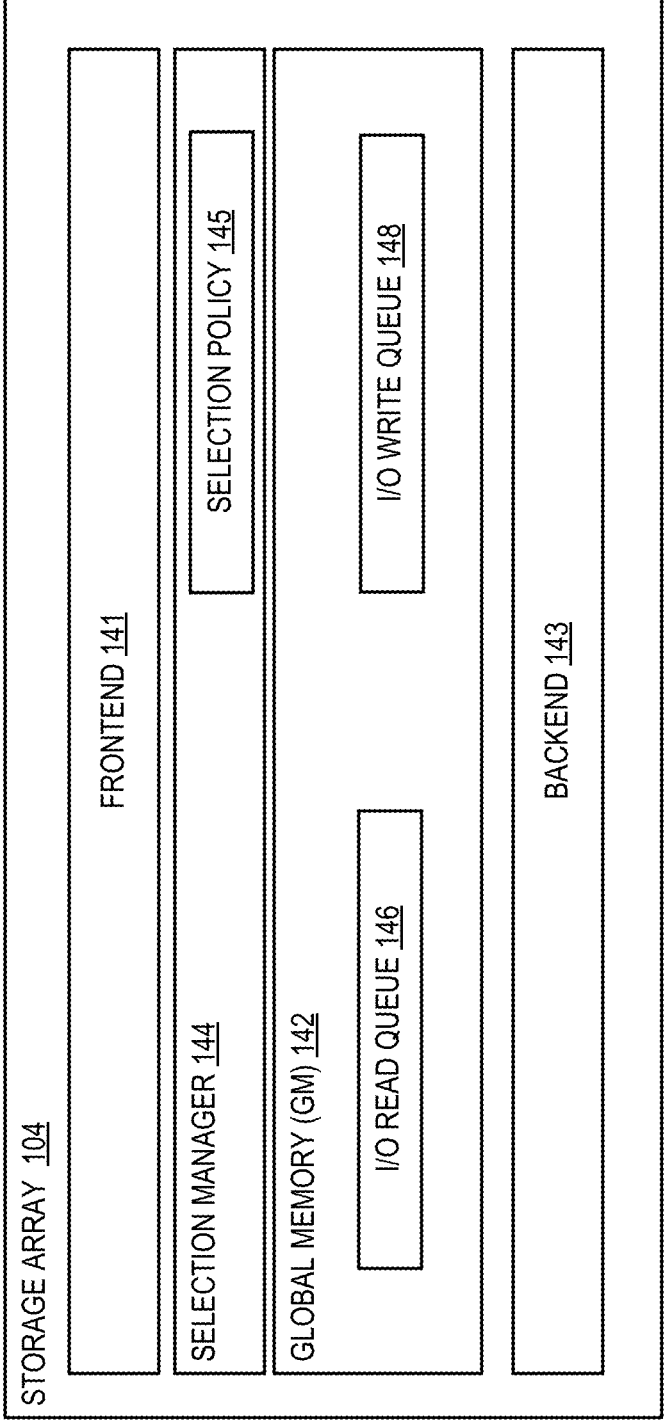
FIG. 1B is a diagram illustrating aspects of the operation of a storage array, according to aspects of the disclosure.

FIG. 1B is a diagram illustrating aspects of the operation of the storage array 104, according to aspects of the disclosure. FIG. 1B illustrates that the storage processors 102 may together implement a frontend 141, a backend 143, and a global memory (GM) 142. GM 142 may include a memory space that is shared among the storage processors in storage array 104, and which is used for the caching of data. GM 142 may be formed by pooling into the same address space the memories of storage processors 102. According to one aspect, GM 142 may be implemented by using a plurality of Dynamic Random Access Memory (DRAM) modules configured to temporarily store I/O requests in one or more queues or stacks, including an I/O read queue 146 and an I/O write queue 148.

Each of the frontend 141 and backend 143 may be implemented as one or more processes that are executed on the storage processors 102. The frontend 141 may be responsible for caching in GM 142 data associated with incoming write requests and the backend 143 may be responsible for destaging the data from GM 142 into the storage devices 114. In addition, the backend 143 may be responsible for loading, into the GM 142, data associated with incoming read requests, and the frontend 141 may be responsible for returning the cached data to the senders of the read requests. The frontend 141 and backend 143 may be implemented as various services (or kernel components) of the storage processors 102.

A selection manager 144 may be configured to implement caching of data into the GM 142, or as described below, managing spillover requests when local GM 142 is full or exceeds a predefined memory utilization threshold. While the manager 144 is depicted as a discrete block, it will be understood that, in some implementations, selection manager 144 may be integrated into the frontend 141 and/or the backend 143. As described herein, the selection manager 144 may be configured to select a memory location and service for incoming I/O requests based on memory utilization levels in the storage array 104.

The cache selection may be performed based on a selection policy 145. The selection policy 145 may be implemented by using one or more of: (i) processor-executable instructions, (ii) logical expressions, (iii) configuration settings, and/or in any other suitable manner. The selection policy 145 may specify one or more rules or conditions for selecting a cache location. In some implementations, at least one of the rules and conditions that comprise selection policy 145 may be based on the current utilization of GM 142, including the number of I/O requests pending in the I/O read queue 146 and/or the I/O write queue 148.

According to one aspect, the selection policy 145 may provide for utilizing additional and available system resources to cache one or more incoming I/O requests. For example, as described herein, the selection policy may implement a Backend as a Service (BEaaS) policy to use backend services and resources over a fabric network to absorb incoming I/O write requests from a host and direct the requests temporarily NVMe storage devices. The selection policy 145 may further use local and/or remote storage arrays 104 connected over the fabric to alleviate strain on local processing resources. According to one aspect, the selection policy 145 may provide for using cut-through writes, including for example, dual-casting over PCIe connections, to send I/O requests directly to the NVMe storage devices, further distributing the I/O request workload.

Figure 2:
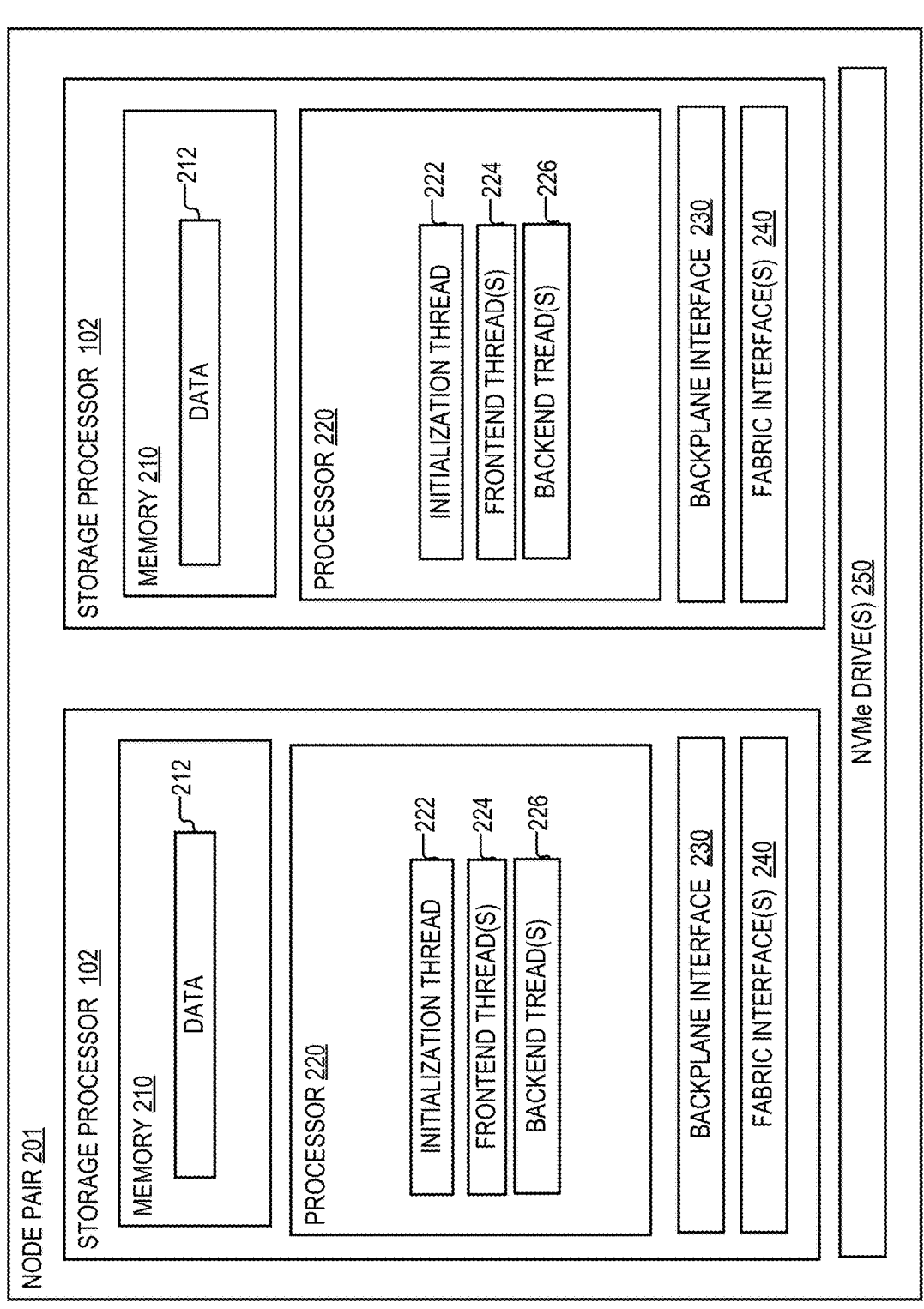
FIG. 2 is a diagram of an example of a storage processor, according to aspects of the disclosure.

FIG. 2 is a diagram of a node pair 201, according to aspects of the disclosure. The node pair 201 may be part of storage array 104. The node pair 201 may include one or more storage processors 102 that are formed on the same motherboard, as well as one or more of storage devices, for example NVMe drives 250. The storage processors 102 and NVMe drives 250 that constitute the node pair 201 may be disposed in the same housing enclosure, such as a disk array enclosure (DAE). In some implementations, the housing enclosure may be integrated into a server rack.

According to aspects of the disclosure, each storage processor 102 of the node pair 201 may include a memory 210, a processor 220, a backplane interface 230, and a fabric interface 240. Memory 210 may include one or more of a random-access memory (RAM), a dynamic random memory (DRAM), a flash memory, a hard drive (HD), a solid-state drive (SSD), a network-accessible storage (NAS), and/or any other suitable type of memory device. The processor 220 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The fabric interface 240 may include one or more InfiniBand adapters. However, in alternative implementations, the interface 240 may include any suitable type of communications interface, such as one or more Ethernet adapters, one or more Wi-Fi adapters (e.g., 802.1414 adapters), and one or more Long-Term Evolution (LTE) adapters.

Memory 210 may store data 212. Data 212 may include, among other data, the selection policy 145 (FIG. 1B) and/or any other suitable type of information. Processor 220 may execute an initialization thread 222 and a plurality of processing threads including frontend threads 224 and backend threads 226. The initialization thread 222 may be configured to update and/or initialize the selection policy 145. The frontend threads 224 and backend threads 226 may include threads that are used to implement and/or otherwise manage the frontend 141, the backend 143, the GM 142, and the selection manager 144 (FIG. 1B).

Figure 3:
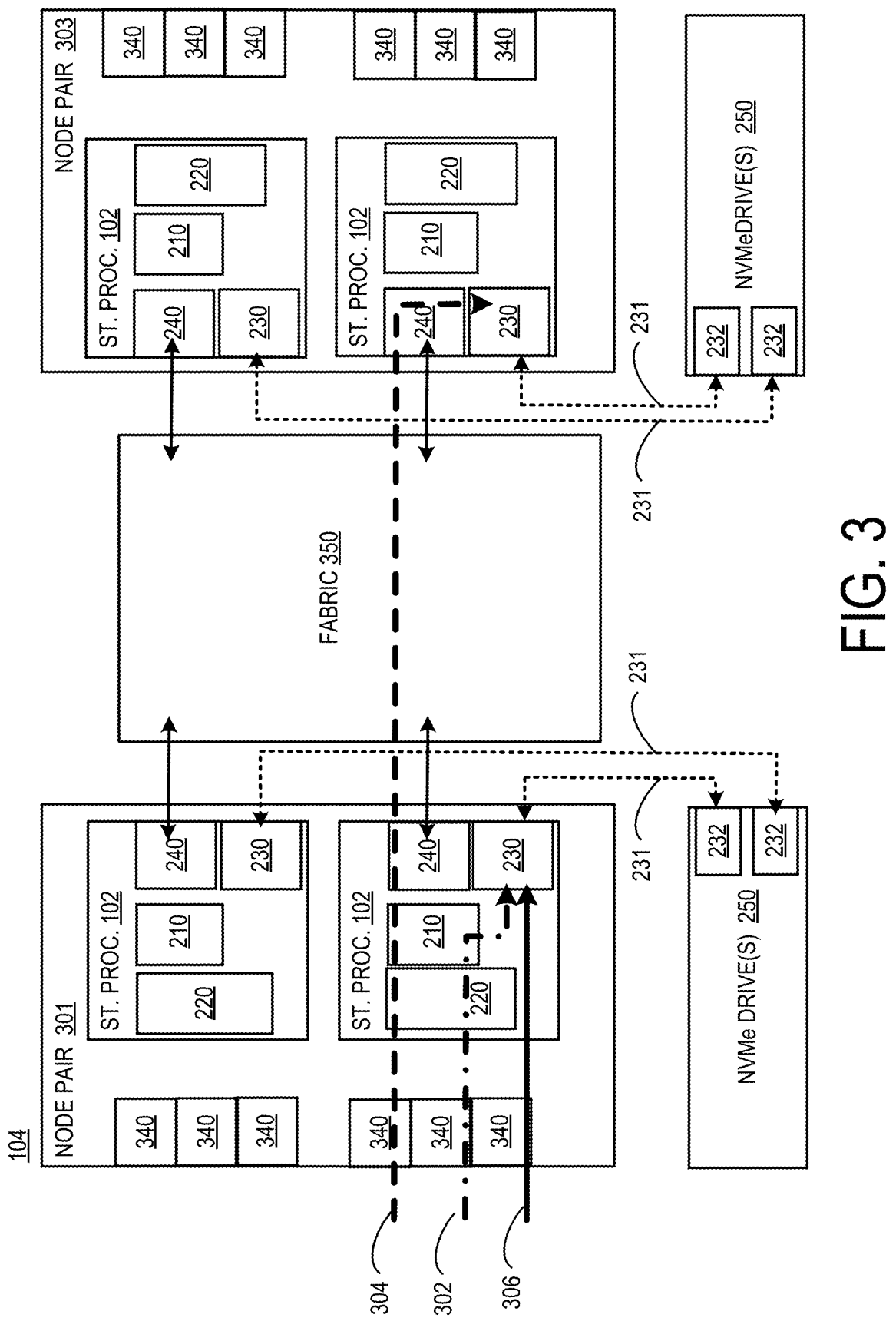
FIG. 3 is a diagram of an example of a storage array, according to aspects of the disclosure.

FIG. 3 is a diagram of an example of storage array 104, according to one aspect of the disclosure. According to one aspect the storage array 104 may be configured in a RAID-1 configuration. The storage array 104 may include one or more node pairs 301, 303. Each of the node pairs 301, 303 may be the same or similar to the node pair 201 discussed above with respect to FIG. 2. The node pairs 301, 303 may include a plurality of host interfaces 340 linked to one or more host devices, such as the host devices 130 of FIG. 1A. Each of the node pairs 301, 303 may include a pair of respective storage processors 102. Each of the storage processors 102 may further include backplane interfaces 230. The respective backplane interface 230 of each storage processor 102 may be coupled via one or more PCIe connections 231 to a PCIe interface 232 of the NVMe drives 250.

The respective fabric interface 240 of each of the storage processors 102 may be an InfiniBand adapter (or any other type of interface). The respective fabric interface 240 of each storage processor 102 may have at least two ports. The respective fabric interface 240 of each of the storage processors in storage array 104 may be coupled via a fabric network 350 to the respective fabric interface 240 of every one of the remaining storage processors 102.

The storage processor 102 may be configured to implement the selection policy 145 (FIG. 1B) to balance workload of incoming I/O requests. The selection policy 145 may include one or more instructions to monitor and process I/O requests by leveraging available local and remote resources during peak operations or upon receiving a burst of I/O requests. According to one aspect, the storage processor may be configured to use under-utilized and available resources across the fabric network 350 to offload incoming I/O requests during a burst, referred to herein as "spillover requests" (i.e., pending I/O requests not able to be processed using local memory), to additional memory in the storage array. The spillover requests may be captured as a remote direct memory access (RDMA) transaction. When the burst of incoming activity subsides, the storage processor may direct the spillover requests to global memory where they may be destaged according to customary I/O operations.

According to one or more aspects, incoming spillover requests, and in particular incoming I/O write requests, may be sent to local or remote non-volatile memory, such as NVMe Drives 250, when local memory 210 is full or exceeds a predefined threshold. Once local memory 210 exceeds the threshold, the storage processor 102 may use the selection policy 145 to write the spillover requests as an RDMA transaction to the NVMe drives 250 using the backend components and resources, including remote storage processors 102. The spillover requests may use a BEaaS policy to use the fabric network 350 to offload the requests from one node of the receiving node pair, like the first node pair 301, to a node in a remote node pair, like the second node pair 303. For example, a first incoming spillover request, shown as arrow 302, may be received by a host interface 340. If the local memory utilization level is above the threshold (e.g., the local cache is near or at full capacity) the storage processor 102 may enable the selection policy 145 to direct the first incoming spillover request 302 to the backplane interface 230 and further to the PCIe interface over PCIe connection 231 using backend services to absorb the request. The request may be temporarily stored, for example, in a controller memory buffer (CMB) of a NVMe drive 250.

According to another aspect, the selection policy 145 may use backend services to direct incoming I/O requests, such as a second spillover request 304, over the fabric network 350 to another storage processor 102 as an RDMA transaction. The second spillover request may include a write request received at the host interface 340 and sent over the fabric 350 where the request will be received at the fabric interface 240 of a different node and further directed to that node's PCIe interface and onto the temporary storage location on the NVMe drive 250. In this manner the storage processors 102 can efficiently handle bursts of incoming I/O requests, particularly write requests, utilizing the BEaaS to leverage available computing resources, including processing and storage resources, of other system components and computing devices.

According to another aspect, incoming spillover I/O requests, such as a third spillover request 306, may be written to the NVMe drives 250 using a cut-through or dual-cast operation. The cut-through operations may alleviate local processing and local memory pressure by bypassing the receiving node's processor 220 and memory 210 and sending the request directly to the PCIe interface and on to the NVMe drives 250. Cut-through operations may also be used to mirror incoming requests to the other node of the node pair. For example, an I/O write request may be received by the Host interface 340 and then mirrored via cut-through/ dual-cast to each node's NVMe drives 250 without the need for staging in DRAM memory 210 first.

Figure 4:
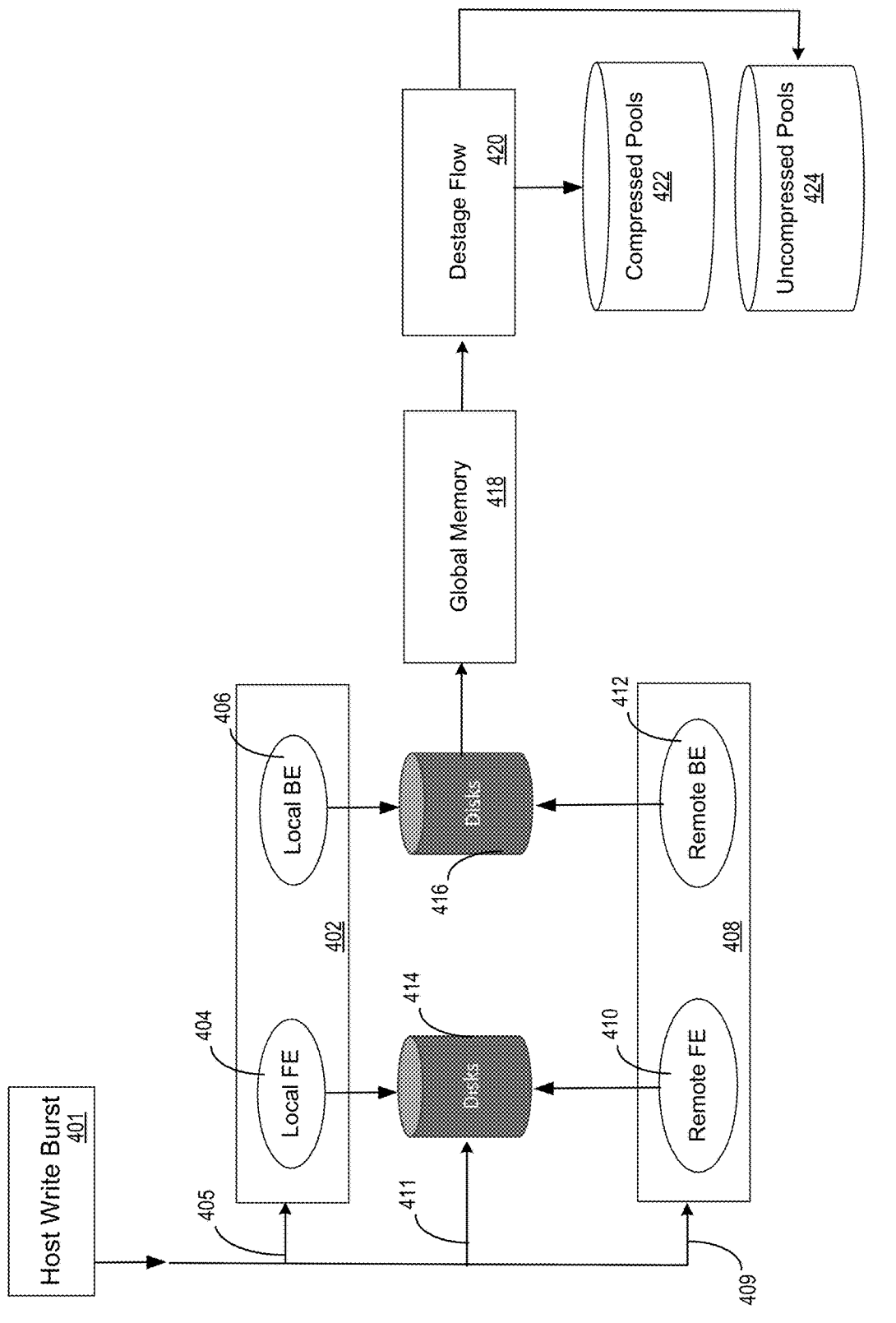
FIG. 4 is a flow diagram of a spillover Input/Output (I/O) request operation, according to aspects of the disclosure.

FIG. 4 depicts an exemplary flow diagram of spillover I/O request operations, according to aspects of the disclosure. According to one or more aspects, a storage processor, like those described herein, may receive a burst of I/O requests, including host write bursts 401, at a time when local cache memory may be full or exceed an predefined threshold. Rather than keep the requests pending in a customary I/O processing stack, the storage processor may invoke or enable a selection policy configured to spill over these requests to a backend storage device to leverage under-utilized resources to timely process and store the requests. The selection policy may include one or more policies to use the BEaaS to process and store incoming I/O write requests locally or remotely using an RDMA transaction. Additionally, the selection policy may provide for utilizing local cut-through operations, including dual-cast operations, to handle incoming I/O write requests.

According to one aspect, a first spillover I/O request, shown at 405, such as a write request, may be received by a first node pair 402. Each node of the node pair 402 may be configured with a frontend core, such as Local FE 404, and a backend core, such as Local BE 406. As used herein, the term "core" may include one or more processors, or processing resources grouped in a manner to accomplish a common set of tasks. The first node pair 402 may be connected to one or more non-volatile memory drives, such as disks 414, 416. If the local memory write pending is full or utilized at or above a predefined threshold, the storage processer may enable the selection policy to handle the spillover write request using the backend, Local BE 406, as a service to absorb the request. According to one aspect, the predefined threshold may be determined according to a number of memory devices, such as disks 414, 416 and other non-volatile memory disks available in the array to receive the spillover requests. The Local FE 404 may process the request using the backend resources, including its connections to disks 414, 416, to process and store the request until local memory write pending level decreases below the threshold. Execution of the request by the processing resources of the Local FE 404 may reduce the processing workload of the backend processing resources being utilized elsewhere, for example in de-staging operations.

According to another aspect, the storage processor may enable the selection policy to use under-utilized resources of remote nodes and node pairs to absorb and process spillover writes over the fabric network. For example, a second spillover I/O write request shown at 409 may be offloaded over the fabric network to a remote, second node pair 402 as an RDMA transaction. The second node pair 408 may be similarly configured to the first node pair 402, with a frontend core, Remote FE 410, and a backend core, Remote BE 412. The second spillover I/O write request may be sent over the fabric network to the Remote BE 412. Remote BE 412 and the second node pair 408 may be under-utilized and may have available processing and cache resources to absorb the request from the first node pair 402. If the local memory on the second node pair 408 is full, or above its own predefined memory usage threshold, the Remote FE 410 may process the request using the resources and connections of the Remote BE 412 to store the request in disks 414, 416. In this manner the second spillover I/O write request, originally received at the first node pair 402 at a time of peak usage, may be offloaded over the fabric network to a remote node pair (i.e., the second node pair 408), where the available resources of the remote node-pair 408 may be used to store the request until such a time as I/O operations have decreased and the request can be destaged in a customary manner.

According to another aspect, the storage processor may be configured to allow incoming spillover I/O write requests to be written directly to disks 414, 416 using a cut-through operation, shown at 411. The cut-through operation may use a dual-cast operation to store the request in the CMB of at least one of the disks 414, 416. According to one aspect, I/O request tags, including data integrity field (DIF) tags, application-level tags, reference tags, and the like may be updated asynchronously. In this manner, tag management may be decoupled from data operations to increase efficiency and resource utilization. This operation will be coincident during the NVMe write operation to the disks 414.

The ability to handle spillover requests using cut-through operations may reduce the consumption of memory bandwidth by bypassing the local node pairs processor and local memory.

According to one aspect of the disclosure, the storage processor may be configured to detect when the local memory utilization has decreased below the threshold. When the memory utilization levels have sufficiently decreased, the storage processor, selection manager and/or selection policy may direct the spillover requests temporarily stored in the non-volatile memory disks 414, 416, to be destaged according to customary I/O operations. For example, the spillover I/O requests may be sent to global memory 418, now that the load on the global memory 418 has been reduced. The spillover requests are then processed according to a destage flow 420 where the requests may be written and stored in either compressed memory pools 422 or uncompressed memory pools 424.

Figure 5:
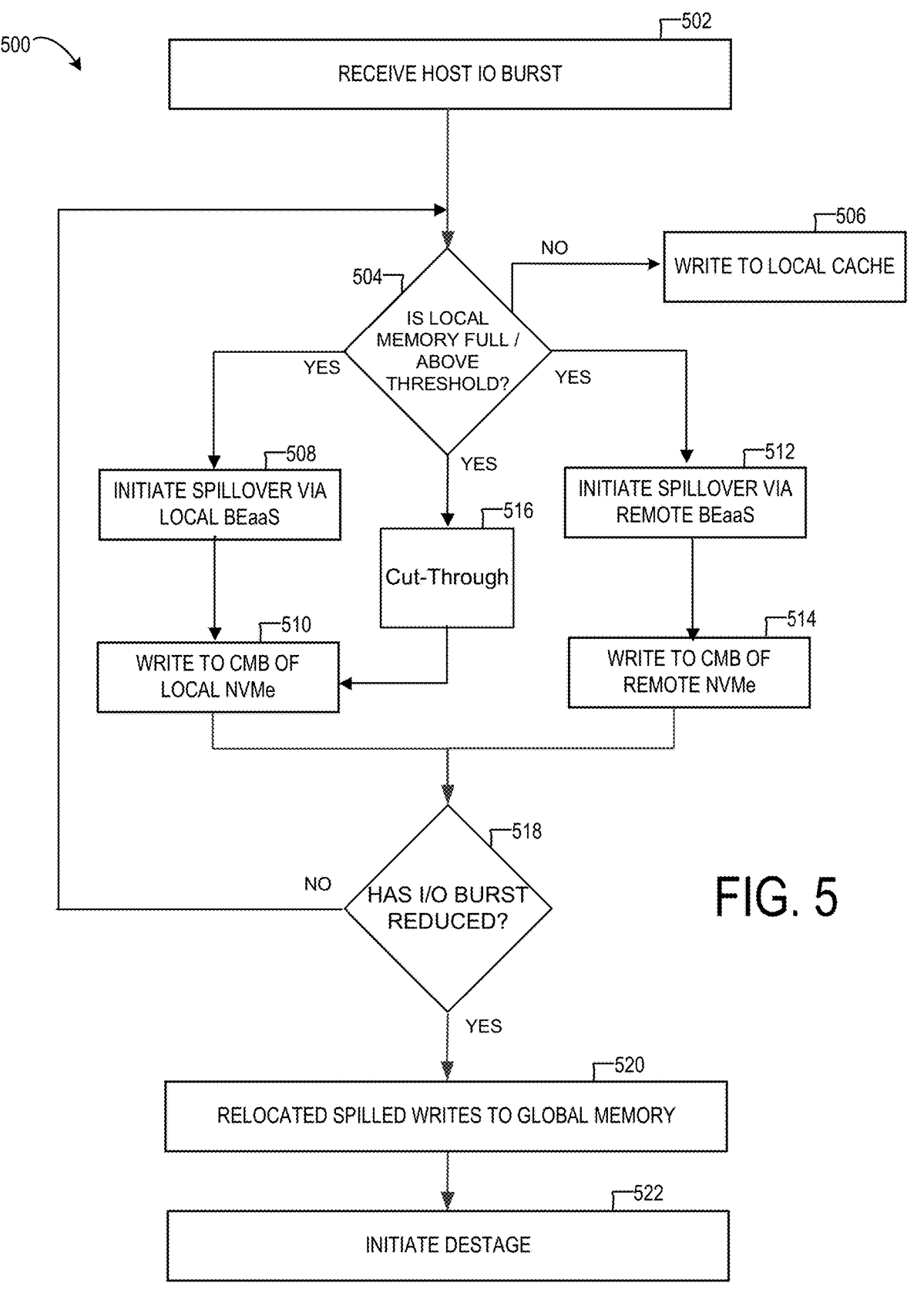
FIG. 5 is a flow diagram of a method of storing an I/O request, according to aspects of the disclosure.

FIG. 5 is a flow diagram of a method 500 of storing an I/O request, including using a BEaaS, according to one or more aspects of the present disclosure. As shown in block 502, a host I/O burst may be received by a storage processor. The I/O burst may include one or more incoming read and/or write requests received at the same time or within a short period of time, thereby occupying local cache memory resources and increasing read/write pending times. According to one aspect, shown in block 504, a local memory (i.e., local cache) utilization level may be checked to determine if the local memory is full, or at or above a predefined threshold. As shown in block 506, if the local memory is not at capacity or above the threshold, a request may be written to local cache and processed in a customary manner, including storing the request in cache for a time followed placing the request in a destaging flow where the request may be pooled and processed accordingly.

If the local memory is at capacity, the request may be, as described herein, be processed according to a selection policy in which a local backend may be used as a service, shown in block 508. The request may be temporarily stored in the CMB of an NVMe drive, as described herein, shown in block 510. Alternatively, if local resources are overloaded, the request, or other spillover requests, may be sent as a RDMA transaction over the fabric network to another node in the storage array where the backend of that node may be used as a service, shown in block 512. The request, as shown in block 514 may be written to a remote NVMe drive for temporary storage. As shown in block 516, the request, or other spillover requests, may instead be processed as a cut-through operation, as described herein. The cut-through operation may bypass the node processor and local memory and write the request directly to the NVMe drive's CMB.

As shown in block 518, the storage processor may determine whether the I/O burst has decreased, and accordingly, whether the local memory utilization has decreased below the threshold. If the memory utilization remains above the threshold, additional I/O operations may continue to be processed according to the previously described methods. If the local memory utilization has decreased below the threshold, the spillover requests relocated to the NVMe drives may be returned to global memory where, as shown in block 522, they may enter a destage flow, as described herein.

The workload balancing described herein, including the use of backend resources as a service to process spillover I/O operations, including I/O write requests, both locally and remotely, allows the storage array system to absorb write burst activity while using smaller local memory segments. Further, as the frontend cores of the node pairs may assume the workload of directing spillover requests, backend cores are relieved of significant processing strain. In addition to increased local resource utilization, the use of the BEaaS also reduces operational pressure in global system processing by distributing the spillover workload to remote processors and other system components that may be underutilized during the I/O burst.

Rather than increasing the amount of costly local cache, such as DRAM, the methods and apparatuses described herein may also be scaled advantageously to accommodate larger systems with greater numbers of nodes, processors and non-volatile memory drives. Accordingly, additional processing and storage resources may be implemented to further distribute and balance I/O workload reducing I/O read and write pending times, thereby increasing efficiency and accountability in the data storage operations.

Figure 6:
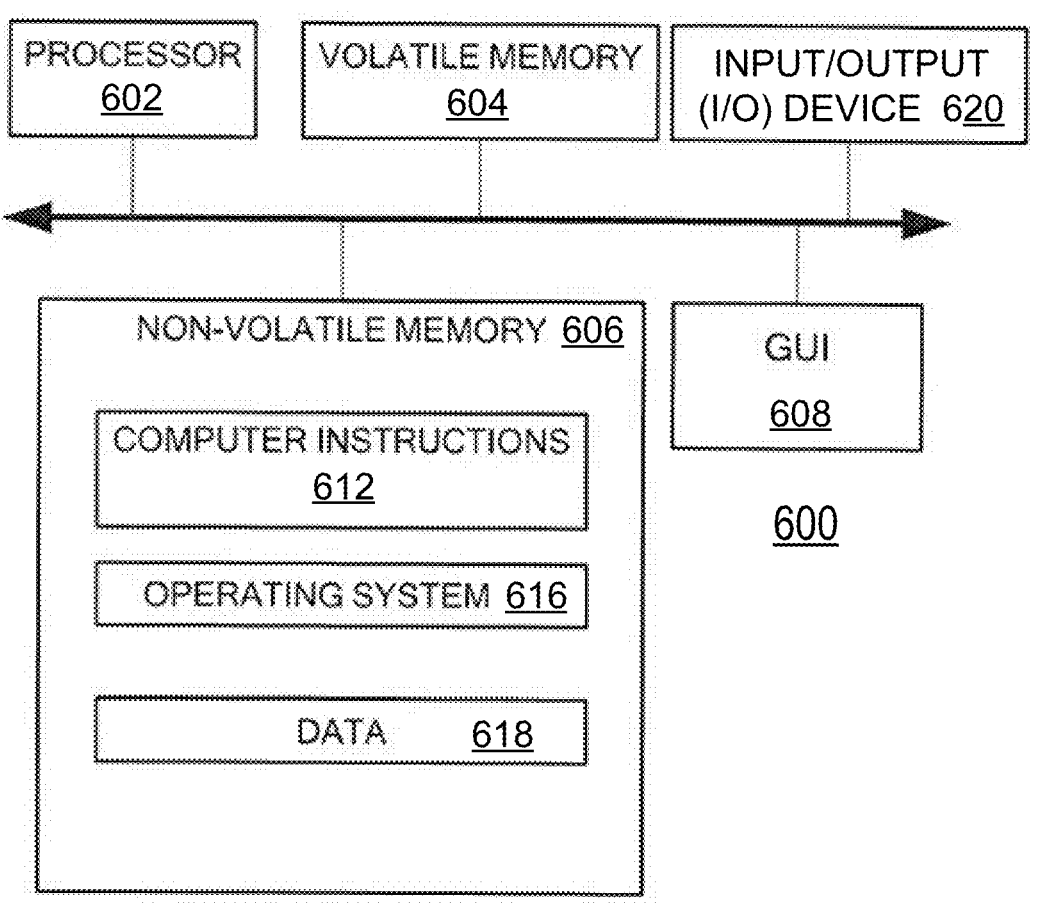
FIG. 6 is a diagram of an example of a computing device, according to aspects of the disclosure.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A computer-implemented method performed by a storage processor comprising a local cache memory, a fabric network interface, and a selection manager executing a selection policy the method comprising:

receiving, at the storage processor an input/output (I/O) request from a host device;

determining, by the selection manager a memory utilization threshold for the local cache memory;

determining by the selection manager, a local memory utilization level of the local cache memory;

in response to determining that the local memory utilization level equals or exceeds the memory utilization threshold;

invoking a backend as a service policy implement ed by the storage processor to generate a remote direct memory access (RDMA) operation encapsulating the I/O request; and transmitting, via the fabric network interface, the RDMA operation to a second memory, thereby temporarily storing the I/O request to reduce local cache memory overflow.

2. The method of claim 1 wherein the RDMA operation is executed by a remote processor.

3. The method of claim 1 wherein the second memory is a RAID-1 array.

4. The method of claim 1 wherein the I/O request is stored a controller memory buffer (CMB) of the second memory.

5. The method of claim 1 wherein the local memory utilization level includes a write pending level.

6. The method of claim 1 further comprising determining the local memory utilization level has decreased below the memory utilization threshold and relocating the I/O request from the second memory to the local cache memory.

7. The method of claim 1 wherein the memory utilization threshold is determined by a number of memory devices.

8. The method of claim 1 wherein the fabric network interface includes an InfiniBand network interface.

9. The method of claim 1 wherein the second memory is a non-volatile memory express (NVMe).

10. A data storage system comprising:

a memory; and at least one processor that is operatively coupled to the memory, the at least one processor being configured to perform the operations of:

receiving an input/output (I/O) request from a host device;

determining a memory utilization threshold for a local cache memory;

determining a local memory utilization level of the local cache memory;

in response to determining that the local memory utilization level equals or exceeds the memory utilization threshold;

invoking a backend as a service policy implemented by the storage processor to generate a remote direct memory access (RDMA) operation encapsulating the I/O request; and transmitting, via a fabric network interface, the RDMA operation to a second memory, thereby temporarily storing the I/O request to reduce local cache memory overflow.

11. The data storage system of claim 10 wherein the RDMA operation is executed by a remote processor.

12. The data storage system of claim 10 wherein the second memory is a RAID-1 array.

13. The data storage system of claim 10 wherein the I/O request is stored a controller memory buffer (CMB) of the second memory.

14. The data storage system of claim 10 wherein the local memory utilization level includes a write pending level.

15. The data storage system of claim 10 further comprising determining the local memory utilization level has decreased below the memory utilization threshold and relocating the I/O request from the second memory to local cache memory.

16. The data storage system of claim 10 wherein the memory utilization threshold is determined by a number of memory devices.

17. The data storage system of claim 10 wherein the fabric network interface includes an InfiniBand network interface.

18. A non-transitory computer-readable medium storing one or more processor-executable instructions, which when executed by at least one processor cause the at least one processor to perform the operations of:

receiving an input/output (I/O) request from a host device;

determining a memory utilization threshold for a local cache memory;

determining a local memory utilization level of the local cache memory;

in response to determining that the local memory utilization level equals or exceeds the memory utilization threshold;

invoking a backend as a service policy implemented by the storage processor to generate a remote direct memory access (RDMA) operation encapsulating the I/O request; and transmitting, via a fabric network interface, the RDMA operation to a second memory, thereby temporarily storing the I/O request to reduce local cache memory overflow.

* * * * *